US010196797B2

(12) United States Patent
Lim et al.

(10) Patent No.: US 10,196,797 B2
(45) Date of Patent: Feb. 5, 2019

(54) PRESSURE PEAK REDUCTION VALVE FOR EXCAVATOR AND PRESSURE PEAK REDUCTION SYSTEM FOR EXCAVATOR COMPRISING SAME

(71) Applicant: Doosan Infracore Co., Ltd., Incheon (KR)

(72) Inventors: Hyun Sik Lim, Incheon (KR); Yong Lak Cho, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 236 days.

(21) Appl. No.: 15/108,311

(22) PCT Filed: Dec. 12, 2014

(86) PCT No.: PCT/KR2014/012254
§ 371 (c)(1),
(2) Date: Jun. 26, 2016

(87) PCT Pub. No.: WO2015/099337
PCT Pub. Date: Jul. 2, 2015

(65) Prior Publication Data
US 2016/0326721 A1 Nov. 10, 2016

(30) Foreign Application Priority Data

Dec. 26, 2013 (KR) ............ 10-2013-0164661

(51) Int. Cl.
*E02F 9/22* (2006.01)
*F15B 13/02* (2006.01)
(Continued)

(52) U.S. Cl.
CPC ............ *E02F 9/2267* (2013.01); *E02F 9/226* (2013.01); *E02F 9/2228* (2013.01); *F15B 11/08* (2013.01);
(Continued)

(58) Field of Classification Search
CPC ..... F04B 49/002; F04B 49/08; F16K 17/0473
(Continued)

(56) References Cited

U.S. PATENT DOCUMENTS 5,295,353 A * 3/1994 Ikari .................. E02F 9/2246
417/34
5,297,381 A * 3/1994 Eich .................. E02F 9/22
60/452
(Continued)

FOREIGN PATENT DOCUMENTS

| JP | 2001-051728 A | 2/2001 | |
| JP | 2003004001 A * | 1/2003 | ............. F15B 11/00 |

(Continued)

OTHER PUBLICATIONS

International Search Report for PCT/KR2014/012254 dated Mar. 9, 2015.

*Primary Examiner* — F. Daniel Lopez
*Assistant Examiner* — Matthew Wiblin
(74) *Attorney, Agent, or Firm* — Hauptman Ham, LLP (57) ABSTRACT

The present disclosure provides a pressure peak reduction valve for an excavator. The pressure peak reduction valve includes at least: a poppet seat which has an inlet port, and at least one communication hole which communicates with a hydraulic tank and is formed in an outer circumferential surface of the poppet seat; a main poppet which slides in the poppet seat; a poppet spring which is provided in the main poppet; a valve seat which has one end portion inserted into the main poppet so as to be in contact with one end portion of the poppet spring; a cone which is provided to be inserted into an openable hole formed at an end portion of the valve seat; an adjustment screw which is provided in the valve seat; and a piston which slides in the adjustment screw.

7 Claims, 5 Drawing Sheets

(51) Int. Cl.
*F16K 17/10* (2006.01)
*F15B 11/08* (2006.01)
*F15B 13/04* (2006.01)
*F16K 17/06* (2006.01)

(52) U.S. Cl.
CPC .......... *F15B 13/024* (2013.01); *F15B 13/026* (2013.01); *F15B 13/0401* (2013.01); *F16K 17/06* (2013.01); *F16K 17/105* (2013.01); *E02F 9/2285* (2013.01); *F15B 2211/2053* (2013.01); *F15B 2211/50554* (2013.01)

(58) Field of Classification Search
USPC .......................... 60/452; 137/115.13, 115.26
See application file for complete search history.

(56) References Cited

U.S. PATENT DOCUMENTS

| | | | | | |
|---|---|---|---|---|---|
| 5,307,631 | A | * | 5/1994 | Tatsumi | E02F 9/2228 60/452 |
| 5,333,449 | A | * | 8/1994 | Takahashi | E02F 9/2232 60/427 |
| 5,743,089 | A | * | 4/1998 | Tohji | E02F 9/2235 60/450 |
| 5,848,531 | A | * | 12/1998 | Nakamura | E02F 9/2228 60/426 |
| 7,513,109 | B2 | * | 4/2009 | Toji | E02F 9/2239 60/422 |
| 7,878,770 | B2 | * | 2/2011 | Oka | E02F 9/2228 417/278 |
| 8,857,169 | B2 | * | 10/2014 | Takahashi | E02F 9/2225 60/422 |
| 9,850,885 | B2 | * | 12/2017 | Sakamoto | F04B 1/324 |
| 2004/0244232 | A1 | * | 12/2004 | Toji | E02F 9/2228 37/348 |
| 2005/0204736 | A1 | * | 9/2005 | Toji | E02F 9/2228 60/468 |
| 2007/0056279 | A1 | * | 3/2007 | Koo | E02F 9/2232 60/452 |

FOREIGN PATENT DOCUMENTS

| | | | |
|---|---|---|---|
| KR | 10-0490479 B1 | 5/2005 | |
| KR | 10-0950571 B1 | 4/2010 | |
| KR | 100950571 B1 * | 4/2010 | ............ F16K 17/04 |
| KR | 10-2011-0058538 A | 6/2011 | |
| WO | 2011-093378 A1 | 8/2011 | |

* cited by examiner

PRESSURE PEAK REDUCTION VALVE FOR EXCAVATOR AND PRESSURE PEAK REDUCTION SYSTEM FOR EXCAVATOR COMPRISING SAME

CROSS REFERENCE TO RELATED APPLICATION

This application claims the priority of Korean Patent Application No. 10-2013-0164661, filed Dec. 26, 2013 in the Korean Intellectual Property Office. Further, this application is the National Phase application of International Application No. PCT/KR2014/012254 filed Dec. 12, 2014, which designates the United States and was published in Korean.

TECHNICAL FIELD

An exemplary embodiment of the present disclosure relates to a valve, and more particularly, to a pressure peak reduction valve for an excavator and a pressure peak reduction system for an excavator comprising the same.

BACKGROUND ART

In general, as a hydraulic system for a construction machine, an open center type hydraulic system and a closed center type hydraulic system are used. There is a negative control system as the open center type hydraulic system, and there are a positive control system and a load sensing system as the closed center type hydraulic system.

Typically, in a case in which the closed center type hydraulic system for an excavator, which uses a pressure control type electrohydraulic pump, is suddenly stopped or a hydraulic cylinder reaches an end stroke during operation, a swash plate angle of the hydraulic pump is decreased.

As the swash plate angle of the hydraulic pump is decreased, a pressure peak instantaneously occurs due to the amount of oil discharged from the hydraulic pump.

The pressure peak, which occurs as described above, has an adverse effect on hydraulic components of the hydraulic system, and as a result, there are problems in that durability of the components deteriorate, and noise occurs due to friction between the hydraulic components.

To solve the aforementioned problems, a relief valve, which has constant operating pressure, is widely used. However, there is a problem in that there is no method of removing a pressure peak in a case in which the pressure peak occurs below pressure set for the relief valve.

DISCLOSURE

Technical Problem

An exemplary embodiment of the present disclosure provides a pressure peak reduction valve for an excavator, which is capable of decreasing a pressure peak occurring in a hydraulic pump of a hydraulic system, and a pressure peak reduction system for an excavator comprising the same.

Technical Solution

According to an exemplary embodiment of the present disclosure, a pressure peak reduction valve for an excavator includes: a poppet seat which has an inlet port into which hydraulic oil discharged from a hydraulic pump flows and which is formed at an end portion of the poppet seat, and at least one communication hole which communicates with a hydraulic tank and is formed in an outer circumferential surface of the poppet seat; a main poppet which slides in the poppet seat; a poppet spring which is provided in the main poppet; a valve seat which has one end portion inserted into the main poppet so as to be in contact with one end portion of the poppet spring; a cone which is provided to be inserted into an openable hole formed at an end portion of the valve seat; an adjustment screw which is provided in the valve seat; and a piston which slides in the adjustment screw.

The pressure peak reduction valve may further include a cone spring which is provided between the cone and the piston.

The pressure peak reduction valve may further include: a piston spring which is inserted into the piston; and a spring seat which supports an end portion of the piston spring.

The pressure peak reduction valve may further include an adjustment nut which is provided on an outer circumferential surface of the adjustment screw.

A pressure peak reduction valve for an excavator includes: a poppet seat which has an inlet port into which hydraulic oil flows from a hydraulic pump and which is formed at an end portion of the poppet seat, and at least one communication hole which communicates with a hydraulic tank and is formed in an outer circumferential surface of the poppet seat; a main poppet which opens and closes the inlet port and the communication hole; a valve seat which allows pressure in a pressure chamber formed in the poppet seat to be maintained to a preset pressure; a poppet spring which presses the main poppet so as to allow a flow path between the inlet port and the communication hole to be kept closed; a cone which drains hydraulic oil in the pressure chamber to the hydraulic tank when pressure in the pressure chamber is equal to or higher than the preset pressure; an adjustment screw which has an end portion to which pilot pressure is inputted from the outside; and a piston which presses the cone by adjusting the preset pressure in the pressure chamber by the pilot pressure inputted to the adjustment screw.

The pressure peak reduction valve may further include a cone spring which returns the cone to an original position.

The pressure peak reduction may further include a piston spring which returns the piston, which has slid to press the cone, to an original state.

The pressure peak reduction valve may further include an adjustment nut which prevents rotation of the adjustment screw.

In addition, a pressure peak reduction system for an excavator according to an exemplary embodiment of the present invention includes: a hydraulic pump for an excavator; a pressure detection unit which detects pressure of the hydraulic pump; an operation pressure detection unit which detects an operation of the excavator; a control unit which controls discharge pressure of the hydraulic pump in accordance with the pressure of the operation pressure detection unit and the pressure of the pressure detection unit; and the pressure peak reduction valve for an excavator according to claim 5, in which a pump input signal inputted to the hydraulic pump from the control unit is pilot pressure of the pressure peak reduction valve for an excavator.

Advantageous Effects

According to the pressure peak reduction valve for an excavator and the pressure peak reduction system for an excavator comprising the same according to the exemplary embodiment of the present disclosure, operating pressure of the valve increases proportionally to pilot pressure, and as a result, it is possible to effectively decrease a pressure peak of the hydraulic pump.

In addition, the pressure peak reduction valve for an excavator according to the exemplary embodiment of the present disclosure has a simple structure, and as a result, it is possible to effectively improve assembly properties and maintainability.

DESCRIPTION OF MAIN REFERENCE NUMERALS OF DRAWINGS

10: Poppet seat
11: Hydraulic pump
12: Inlet port
13: Hydraulic tank
14: Communication hole
15: Pressure chamber
20: Main poppet
21: Through hole
22: Poppet spring
30: Valve seat
31: Openable hole
40: Cone
41: Cone spring
50: Adjustment screw
51: Adjustment nut
52: Washer
60: Piston
61: Piston spring
62: Spacer
63: Spring seat
Pi: Pilot pressure
PP: Pump pressure
101: Pressure peak reduction valve

BEST MODE

Hereinafter, exemplary embodiments of the present disclosure will be described in detail with reference to the accompanying drawings so that those skilled in the technical field to which the present disclosure pertains may easily carry out the exemplary embodiments. The present disclosure may be implemented in various different ways, and is not limited to the exemplary embodiments described herein.

It is noted that the drawings are schematic, and are not illustrated based on actual scales. Relative dimensions and proportions of parts illustrated in the drawings are exaggerated or reduced in size for the purpose of clarity and convenience in the drawings, and any dimension is just illustrative but not restrictive. Further, the same reference numerals designate the same structures, elements or components illustrated in two or more drawings in order to exhibit similar characteristics.

Exemplary embodiments of the present disclosure illustrate ideal exemplary embodiments of the present disclosure in more detail. As a result, various modifications of the drawings are expected. Therefore, the exemplary embodiments are not limited to specific forms in regions illustrated in the drawings, and for example, include modifications of forms by the manufacture.

Hereinafter, a pressure peak reduction valve 101 for an excavator according to an exemplary embodiment of the present disclosure will be described with reference to FIGS. 1 and 2.

Figure 1:
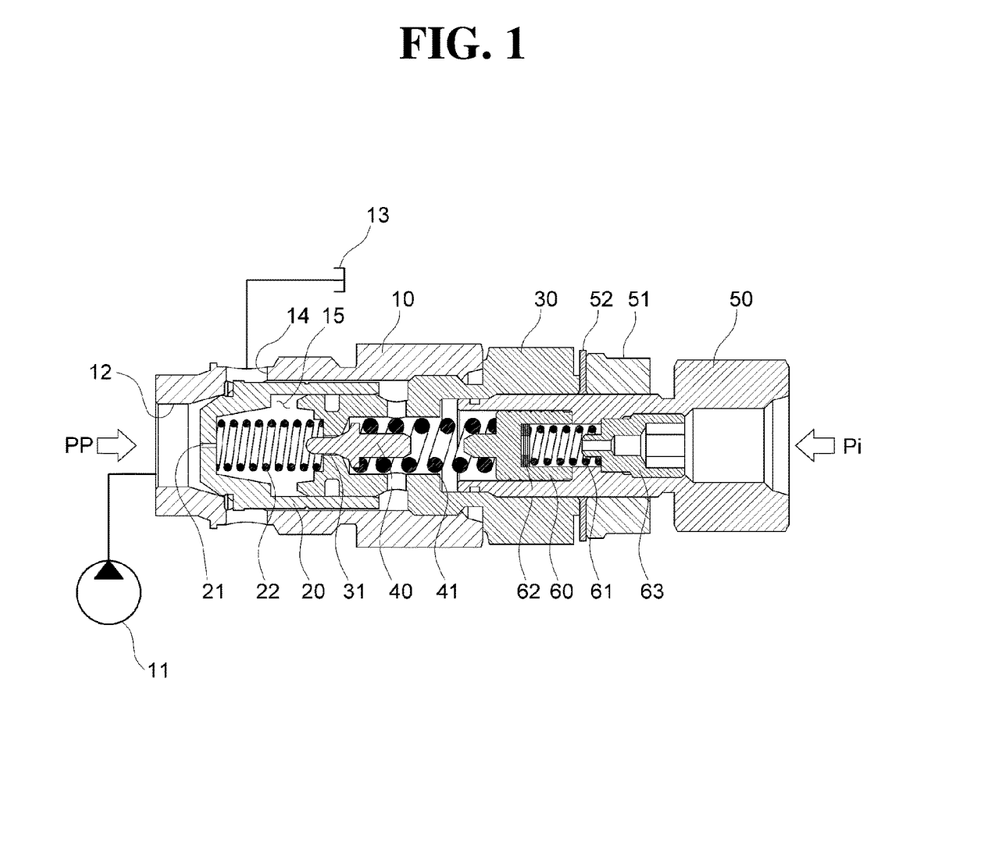
FIG. 1 is a cross-sectional view of a pressure peak reduction valve for an excavator according to an exemplary embodiment of the present disclosure.
Figure 2:
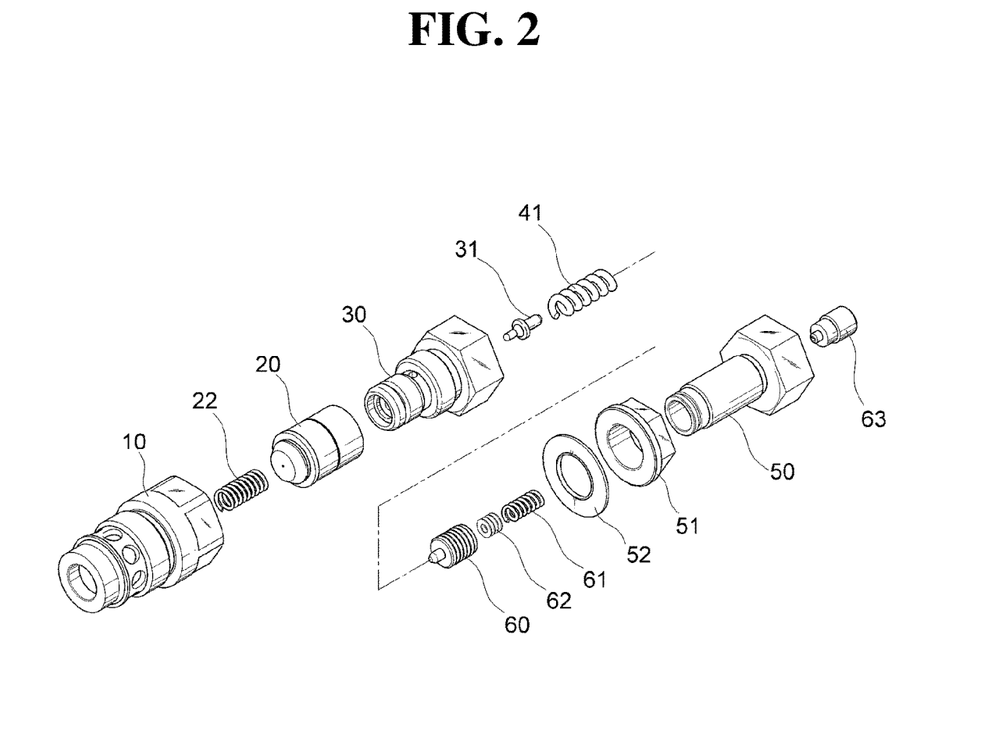
FIG. 2 is an exploded perspective view of the pressure peak reduction valve for an excavator according to the exemplary embodiment of the present disclosure.

As illustrated in FIGS. 1 and 2, the pressure peak reduction valve 101 for an excavator according to the exemplary embodiment of the present disclosure includes a poppet seat 10, a main poppet 20, a valve seat 30, a cone 40, an adjustment screw 50, and a piston 60.

An inlet port 12 and a communication hole 14 are formed in the poppet seat 10. Specifically, the inlet port 12 is provided at an end portion of the poppet seat 10, and hydraulic oil discharged from a hydraulic pump 11 flows into the inlet port 12. At least one communication hole 14 is formed along an outer circumferential surface of the poppet seat 10, and communicates with a hydraulic tank 13.

The main poppet 20 is provided in the poppet seat 10, and a through hole 21 is formed at one end portion of the main poppet 20. The main poppet 20 slides leftward and rightward inside the poppet seat 10, and connects the inlet port 12 and the communication hole 14 so as to enable the hydraulic oil discharged from the hydraulic pump 11 to flow out toward the hydraulic tank 13.

A poppet spring 22 is provided in the main poppet 20. The poppet spring 22 presses the main poppet 20 so as to allow a portion between the inlet port 12 and the communication hole 14 to be kept closed.

One end portion of the valve seat 30 is inserted into the main poppet 20 so as to be in contact with one end portion of the poppet spring 22. The valve seat 30 is configured such that preset pressure may be formed in a pressure chamber 15 formed in the poppet seat 10.

An openable hole 31 is provided at an end portion of the valve seat 30. The cone 40 is inserted into the openable hole 31. When pressure in the pressure chamber 15 exceeds the preset pressure, the cone 40 drains the hydraulic oil from the pressure chamber 15 to the hydraulic tank 13.

A cone spring may be further provided to be able to return the cone 40 back to the original state after the cone 40 is inserted into the openable hole 31. A size and a shape of the cone spring 41 may vary depending on those skilled in the art who carry out the present disclosure.

The adjustment screw 50 is coupled in the valve seat 30, and pilot pressure Pi is inputted to an end portion of the adjustment screw 50 from the outside.

To prevent the adjustment screw 50 from rotating forward or reversely when the pilot pressure Pi is inputted to the adjustment screw 50, an adjustment nut 51 is provided on an outer circumferential surface of the adjustment screw 50.

Here, according to the exemplary embodiment of the present disclosure, the nut is used to prevent the adjustment screw 50 from rotating forward and reversely, but other fastening members may be used to prevent the rotation of the adjustment screw 50.

Here, the valve seat 30 and the adjustment nut 51 according to the exemplary embodiment of the present disclosure are made of a metallic material although not necessarily limited thereto and thus cause friction between the two members.

To prevent the friction, a washer 52 may be further provided between the valve seat 30 and the adjustment nut 51. The washer 52 according to the exemplary embodiment of the present disclosure may be made of rubber, ceramic, or the like instead of a metallic material, and may be modified depending on those skilled in the art who carry out the present disclosure.

The piston 60 is positioned in the adjustment screw 50, and the piston 60 slides by the pilot pressure Pi inputted to the adjustment screw 50 so as to adjust the preset pressure in the pressure chamber 15 of the poppet seat 10, thereby pressing the cone 40.

According to the exemplary embodiment of the present disclosure, a spring seat 63 is provided in the adjustment screw, and a piston spring 61, which has one end portion in contact with the piston 60 and the other end portion in contact with the spring seat 63, may be further provided.

In addition, the piston spring 61 returns the piston 60, which has slid to press the cone 40, back to the original state.

According to the exemplary embodiment of the present disclosure, a diameter and a shape of the piston spring 61 may vary depending on those skilled in the art who carry out the present disclosure, but are not limited thereto.

A spacer 62 may be further provided between the piston 60 and the piston spring 61. The spacer 62 may be a spacer publicly known to those skilled in the art, and the spacer 62 maintains a uniform interval between the piston 60 and the piston spring 61.

Figure 3:
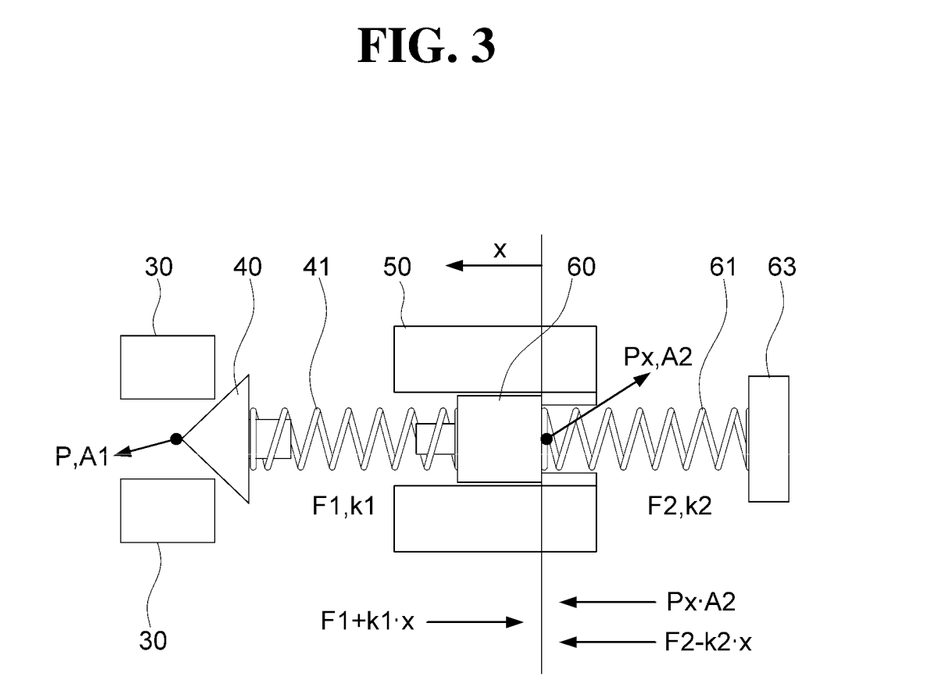
FIGS. 3 and 4 are views illustrating an operation of the pressure peak reduction valve for an excavator according to the exemplary embodiment of the present disclosure.

An operation of the pressure peak reduction valve 101 for an excavator according to the exemplary embodiment of the present disclosure will be described with reference to FIGS. 3 and 4.

First, an operating principle of a typical valve will be described with reference to FIG. 3.

A value calculated by multiplying pump pressure PP by an effective area A1 on which the pump pressure PP is applied equals to a value calculated by multiplying tension F1 of the cone spring 41 by a value calculated by adding an elastic modulus k1 of the cone spring 41 by displacement (x) of the piston 60.

That is, the pump pressure PP is defined as a value calculated by dividing a value, which is calculated by adding the tension F1 of the cone spring 41 to the product of the elastic modulus k1 of the cone spring 41 and the displacement (x) of the piston 60, by the effective area A1 on which the pump pressure PP is applied.

$$PP \times A1 = F1 + k1 \times x$$
$$\therefore PP = \frac{1}{A1}(F1 + k1 \times x)$$

In this case, the pump pressure PP may vary depending on force exerted by the piston 60, that is the displacement (x) of the piston 60.

As an example, in a case in which the tension F1 of the cone spring 41 is equal to or greater than a value calculated by adding tension F2 of the piston spring 61 to the product of the pilot pressure Pi and a diameter A2 of the piston 60, the displacement (x) of the piston 60 becomes zero (0).

$$F1 \geq Pi \times A2 + F2, (x=0)$$

On the contrary, in a case in which the tension F1 of the cone spring 41 is smaller than the value calculated by adding the tension F2 of the piston spring 61 to the product of the pilot pressure Pi and the diameter A2 of the piston 60, the displacement) of the piston 60 is not zero (0).

$$F1 < Pi \times A2 + F2, (x \neq 0)$$

Therefore, the value of the displacement (x) of the piston 60 is calculated by dividing a value, which is calculated by subtracting the tension F1 of the cone spring 41 from a value calculated by adding the tension F2 of the piston spring 61 to the product of the pilot pressure Pi and the diameter A2 of the piston 60, by the sum of the elastic modulus k1 of the cone spring 41 and the elastic modulus k2 of the piston spring 61.

$$F1 + k1 \times x = Pi \times A2 + F2 - k2 \times x$$
$$x = \frac{Pi \times A2 + F2 - F1}{k1 + k2}$$

An operation of the pressure peak reduction valve 101 according to the exemplary embodiment of the present disclosure will be described with reference to the aforementioned operating principle.

Figure 4:
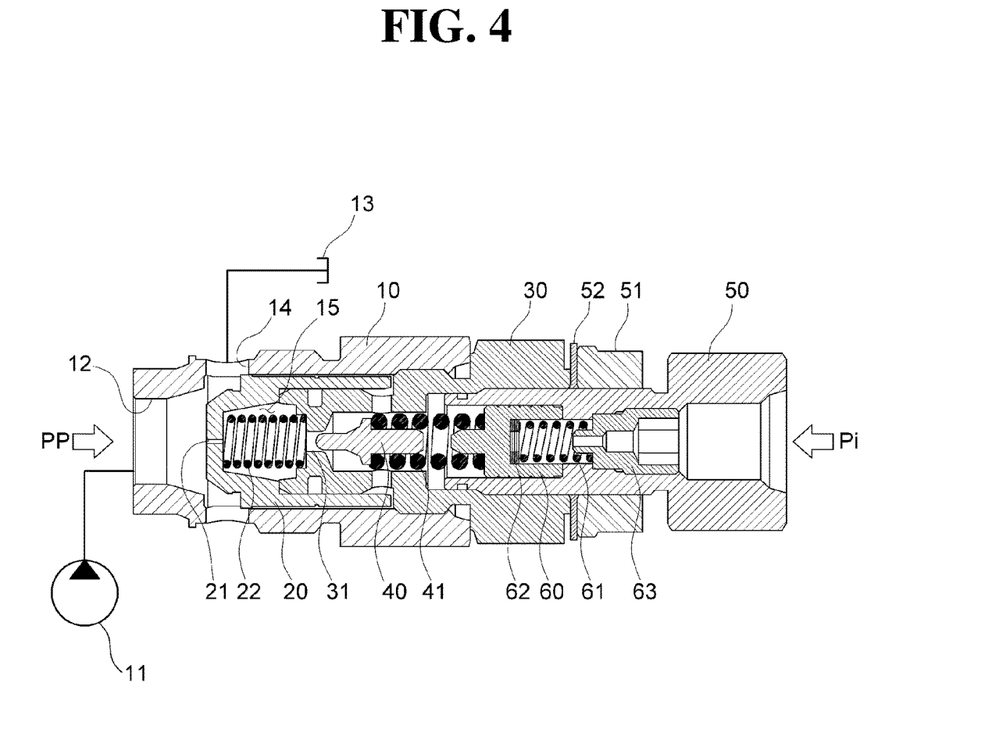

As illustrated in FIG. 4, when the pilot pressure Pi is inputted to the adjustment screw 50, the piston 60 slides leftward. Therefore, while the cone spring 41 is compressed, tension of the cone spring 41 increases. That is, the increase in tension of the cone spring 41 means an increase in operating pressure of the pressure peak reduction valve 101.

In this case, in a case in which the excavator is suddenly stopped or the excavator abnormally operates, the pump pressure PP of the hydraulic pump 11 increases to be greater than the operating pressure of the valve, and pushes the cone 40 rightward, and as a result, the hydraulic oil inputted from the hydraulic pump 11 flows through the openable hole 31 of the valve seat 30.

Therefore, as the hydraulic oil flows along the cone 40, a pressure difference occurs between the left and right sides of the main poppet 20 because of the through hole 21 formed in the main poppet 20. For this reason, the main poppet 20 slides rightward, and as a result, the hydraulic oil, which is discharged and inflows from the hydraulic pump 11, flows into the hydraulic tank 13 via the communication hole 14.

Meanwhile, when pressure of the hydraulic pump 11 drops as time passed, the cone 40 returns back to the original position by the cone spring 41 and thus closes the openable hole 31 of the valve seat 30.

Therefore, the main poppet 20 also slides leftward by the poppet spring 22 and returns to the original position.

That is, a portion between the hydraulic pump 11 and the hydraulic tank 13 is closed, and as a result, the same pressure is formed at the left and right sides based on the through hole 21 of the main poppet 20.

Figure 5:
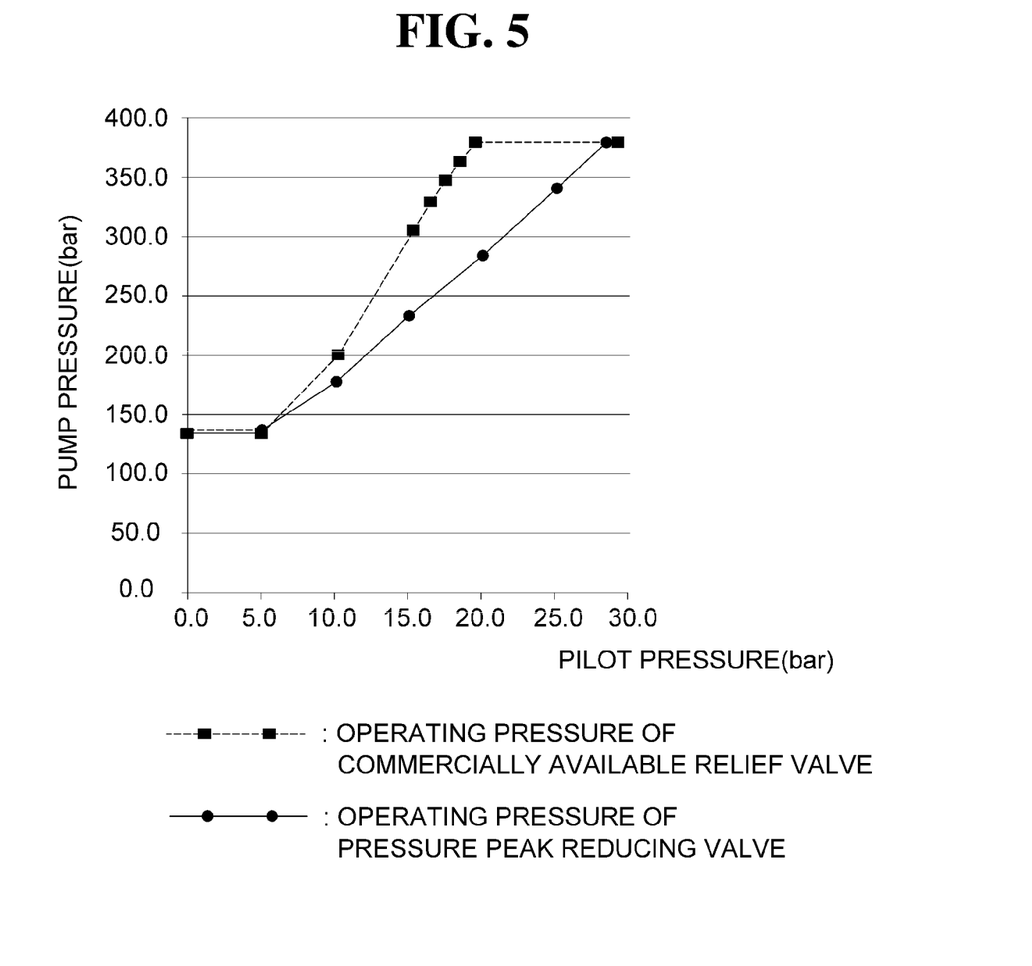
FIG. 5 is a graph illustrating data according to a test using the pressure peak reduction valve for an excavator according to the exemplary embodiment of the present disclosure.

FIG. 5 is a graph illustrating operating pressure of the pressure peak reduction valve 101 for an excavator which operates as described above.

A horizontal axis of the graph indicates the pilot pressure Pi, and a vertical axis indicates the pump pressure PP. A dotted line indicating comparative values represents operating pressure of a commercially available relief valve, and a solid line indicating experimental values represents operating pressure of the pressure peak reduction valve 101 according to the present disclosure.

As illustrated in FIG. 5, in the pressure peak reduction valve 101 according to the exemplary embodiment of the present disclosure, the operating pressure of the valve is lower than the operating pressure of the commercially available relief valve in a high pressure region.

That is, it can be seen that unlike the operating pressure of the commercially available relief valve, the operating pressure of the pressure peak reduction valve 101 increases proportionally to the pilot pressure Pi inputted to the valve, and as a result, a pressure peak occurring in the valve is reduced.

In addition, a pressure peak reduction system including the pressure peak reduction valve 101 will be described.

The pressure peak reduction system includes the hydraulic pump 11, a non-illustrated pressure detection unit, an operation pressure detection unit, a control unit, and the pressure peak reduction valve 101.

The pressure detection unit detects pressure of the hydraulic pump, and the operation pressure detection unit detects an operation of the excavator.

The control unit controls discharge pressure of the hydraulic pump in accordance with the pressure of the hydraulic pump which is detected by the pressure detection unit and the pressure detected by the operation pressure detection unit.

That is, a pump input signal inputted to the hydraulic pump from the control unit may be the pilot pressure of the pressure peak reduction valve 101 for an excavator according to the exemplary embodiment of the present disclosure.

With the aforementioned configuration, in the pressure peak reduction valve for an excavator and the pressure peak reduction system for an excavator comprising the same according to the exemplary embodiment of the present disclosure, the operating pressure of the valve increases proportionally to the pilot pressure Pi, and as a result, it is possible to effectively reduce a pressure peak occurring in the hydraulic pump 11.

In addition, the pressure peak reduction valve 101 for an excavator according to the exemplary embodiment of the present disclosure has a simple structure, and as a result, it is possible to effectively improve assembly properties and maintainability.

The exemplary embodiment of the present disclosure has been described with reference to the accompanying drawings, but those skilled in the art will understand that the present disclosure may be carried out in any other specific form without changing the technical spirit or an essential feature thereof.

Accordingly, it should be understood that the aforementioned exemplary embodiment is described for illustration in all aspects and is not limited, and the scope of the present disclosure shall be represented by the detailed description and the claims to be described below, and it should be construed that all of the changes or modified forms induced from the meaning and the scope of the claims, and an equivalent concept thereto are included in the scope of the present disclosure.

The invention claimed is:

1. A pressure peak reduction valve for an excavator, the pressure peak reduction valve comprising:
 a poppet seat which has an inlet port into which hydraulic oil discharged from a hydraulic pump flows and which is formed at an end portion of the poppet seat, and at least one communication hole which communicates with a hydraulic tank and is formed in an outer circumferential surface of the poppet seat;
 a main poppet which slides in the poppet seat;
 a poppet spring which is provided in the main poppet;
 a valve seat which has one end portion inserted into the main poppet so as to be in contact with one end portion of the poppet spring;
 a cone which is provided to be inserted into an openable hole formed at the one end portion of the valve seat;
 an adjustment screw which is provided in the valve seat;
 a cone spring which is provided between the cone and the piston; and
 a piston which slides in a direction of pressing the cone spring inside the adjustment screw, when an increase of a pilot pressure is inputted to the adjustment screw.

2. The pressure peak reduction valve of claim 1, further comprising:
 a piston spring which is inserted into the piston; and
 a spring seat which supports an end portion of the piston spring.

3. The pressure peak reduction valve of claim 1, further comprising:
 an adjustment nut which is provided on an outer circumferential surface of the adjustment screw.

4. A pressure peak reduction valve for an excavator, the pressure peak reduction valve comprising:
 a poppet seat which has an inlet port into which hydraulic oil flows from a hydraulic pump and which is formed at an end portion of the poppet seat, and at least one communication hole which communicates with a hydraulic tank and is formed in an outer circumferential surface of the poppet seat;
 a main poppet which opens and closes the inlet port and the communication hole;
 a valve seat which allows pressure in a pressure chamber formed in the poppet seat to be maintained to a preset pressure;
 a poppet spring which presses the main poppet so as to allow a flow path between the inlet port and the communication hole to be kept closed;
 a cone which drains the hydraulic oil in the pressure chamber to the hydraulic tank when the pressure in the pressure chamber is equal to or higher than the preset pressure;
 an adjustment screw which has an end portion to which pilot pressure is inputted from the outside;
 a cone spring which returns the cone to an original position; and
 a piston which slides in a direction of pressing the cone spring inside the adjustment screw by an increase of the pilot pressure is inputted to the adjustment screw.

5. The pressure peak reduction valve of claim 4, further comprising:
 a piston spring which returns the piston, which has slid to press the cone, to an original state.

6. The pressure peak reduction valve of claim 4, further comprising:
 an adjustment nut which prevents rotation of the adjustment screw.

7. The pressure peak reduction valve of claim 4, wherein the pressure peak reduction valve is included in a pressure peak reduction system for an excavator, the pressure peak reduction system comprising:
 the hydraulic pump for an excavator;
 a pressure detection unit which detects a discharge pressure of the hydraulic pump;
 an operation pressure detection unit which detects an operation of the excavator; and
 a control unit which controls the discharge pressure of the hydraulic pump in accordance with the operation detected by the operation pressure detection unit and the discharge pressure detected by the pressure detection unit, wherein a pump input signal inputted to the hydraulic pump from the control unit is the pilot pressure inputted to the pressure peak reduction valve for an excavator.

* * * * *